April 4, 1944. J. BARDEGA 2,346,063
VERNIER HEIGHT GAUGE
Filed Oct. 29, 1943 2 Sheets-Sheet 1
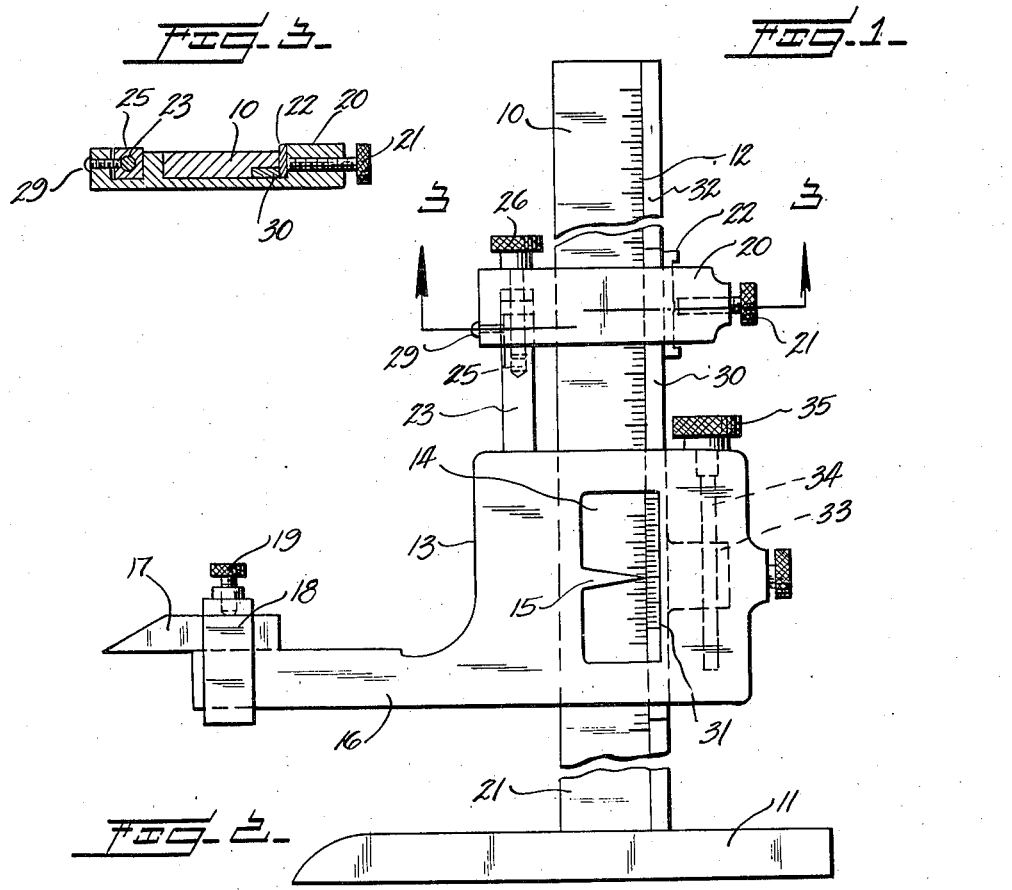
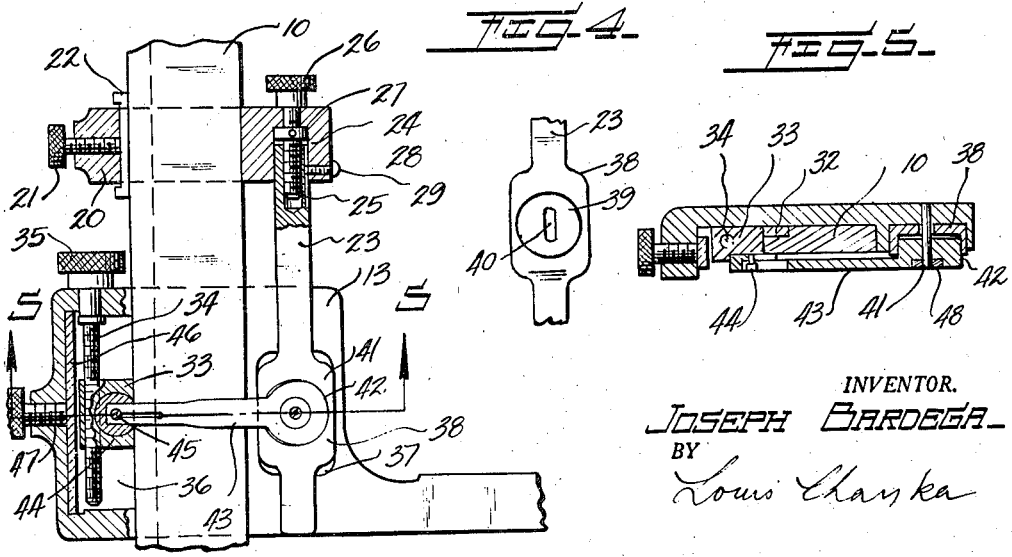
INVENTOR.
JOSEPH BARDEGA
BY
Louis Chayka April 4, 1944.　　　　J. BARDEGA　　　　2,346,063
VERNIER HEIGHT GAUGE
Filed Oct. 29, 1943　　　2 Sheets-Sheet 2
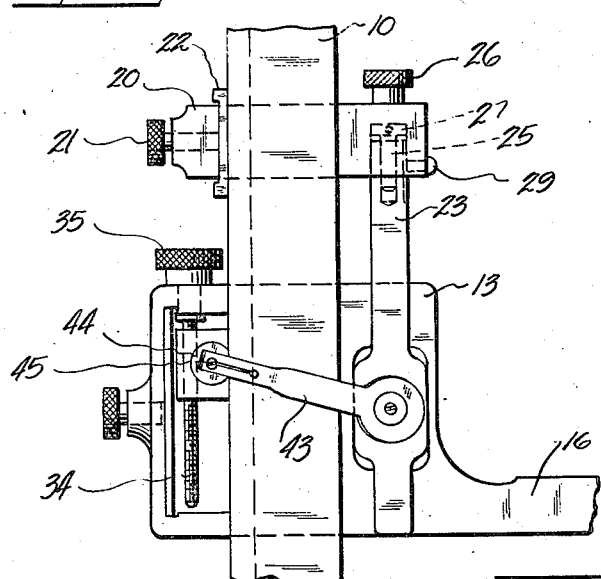
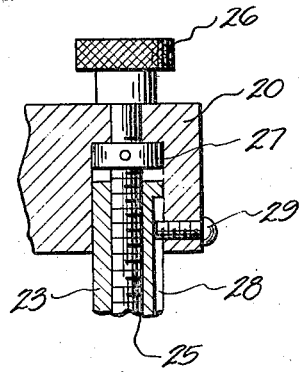
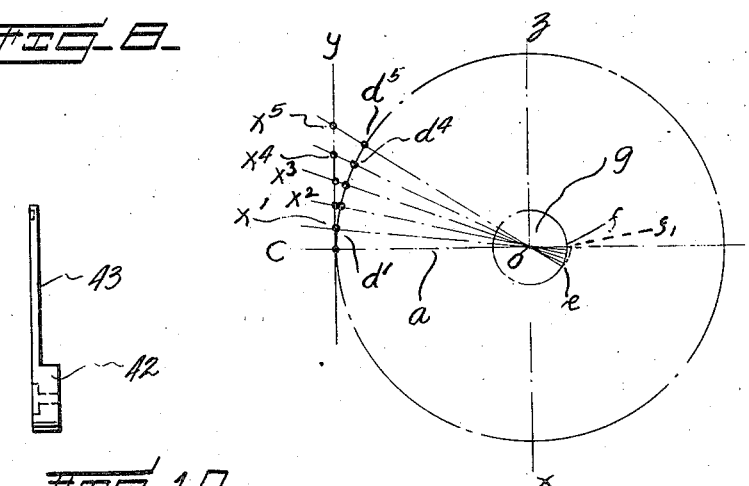
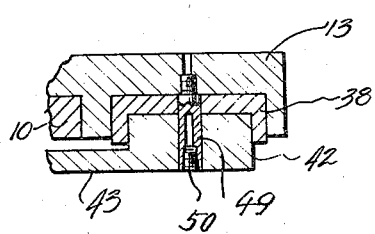
INVENTOR.
JOSEPH BARDEGA.
BY
Louis Chayka Patented Apr. 4, 1944

2,346,063

UNITED STATES PATENT OFFICE 2,346,063

VERNIER HEIGHT GAUGE

Joseph Bardega, Detroit, Mich.

Application October 29, 1943, Serial No. 508,209

3 Claims. (Cl. 33—170)

The purpose of my improvement is to provide a height gauge in which vernier calibrations are spaced from each other to such an extent that exact measurements of minute units of length may be easily read and distinguished. Specifically, minute linear distances are indicated on my gauge by calibrations far exceeding said distances. In other words, units of calibration are much larger than the units of length which said calibrations represent.

Another purpose of my invention is to provide a reliable gauge of simple construction and having but a small number of parts.

I have accomplished these purposes by novel means and by a novel combination of parts. I shall now describe my said gauge with reference to the accompanying drawings in which, Fig. 1 is the front elevation of my gauge;

Fig. 2 is a rear view, partly in section, of a sliding head and a clamp, both being vital elements of my gauge, and a fragmentary rear elevation of the beam on which said clamp and said head are mounted;

Fig. 3 is a sectional view of my gauge, taken on line 3—3 of Fig. 1;

Fig. 4 is a fragmentary plan view of a member shown in Fig. 2;

Fig. 5 is a sectional view of the above said sliding head, taken on line 5—5 of Fig. 2;

Fig. 6 is a rear elevation of the sliding head, as in Fig. 2, but showing a different relative position of its working parts;

Fig. 7 is an enlarged view of a detail shown in Fig. 2;

Fig. 8 is a side elevation of a member, being a part of a mechanism, contained in the sliding head of my gauge;

Fig. 9 is a diagram illustrating the theoretical basis of my gauge. Fig. 10 is a modified detail of view shown in Fig. 5.

Similar numerals refer to similar parts throughout the several views.

The gauge of my construction comprises an upright beam 10, rising from a base 11. The beam is made in the shape of a flat bar, substantially rectangular in form, and is provided with calibrations 12. These may be of the standard type, each representing the distance of 1/40 part of an inch, though obviously any other division may be adapted if desirable. A head 13, which may be slidingly moved up and down, respectively, on said beam, contains a rectangular frame or window 14, and a pointer 15, directed towards the calibrations on the beam. An arm 16, laterally jutting out of the head, serves to support a scriber 17, which may be secured to the arm by means of a yoke 18 and a knurled adjusting screw 19.

Spaced from the head and also in a sliding relation to the beam is a clamp 20, equipped with a friction plate 22, bearing against the side of beam 10, and a knurled screw 21 to bear against said plate. At the opposite end, said clamp is connected with head 13 by means of a bar 23, the upper end of which is seated within a rectangular slot 24. An adjusting screw 25, having a knurled head 26 projecting above the upper surface of the clamp, is threaded into the upper end of said bar 23, and has a collar 27, which prevents a longitudinal movement of the screw with respect to the clamp. A longitudinal slot 28 in the side of the upper end of said bar 23 and a screw 29 which extends into said slot, prevent the bar from being entirely withdrawn from slot 24 but allows within certain limits, longitudinal movement of the bar with respect to the above said clamp.

By means of the arrangement of parts already described, it is possible to obtain measurements within the capacity of the calibrations appearing on beam 10. No explanation how this may be accomplished, is needed, as the function of each part thus far described, is quite obvious. I shall nevertheless allude thereto in connection with the description of my provisions for vernier measurements. I am using for this purpose a separate sliding ruler 30, marked with calibrations 31, and fitting into a rectangular recess in beam 10, so that the face of the ruler is flush with the face of the beam. Approximately midway its length, the ruler is integrally connected to a laterally extending block 33. The block is disposed within a hollowed out space 36 in head 13, between beam 10 and plate 46. Screw 47 serves to keep plate 46 in a sliding contact with the block which may be moved up and down within head 13 by means of a screw 34, having a head 35, and passing through a threaded hole in the block parallel to beam 10. On the opposite side of the beam but on the same side of head 13, said head contains a recess 37 to accommodate an expanded portion 38 of bar 23. Said portion 38 contains a substantially circular socket 39 with an oblong opening 40 in its bottom. A pin set in the above said head 10, as shown in Fig. 5, passes through said opening 40 into socket 39. Assuming that clamp 20 is secured against longitudinal movement with respect to the beam, it is possible to move head 13, by means of said pin 41 with respect to bar 23 which is stationary. In order to allow the movement of head 13 with respect to the expanded portion 38 of bar 23, recess 37 is slightly spaced from portion 38, both at the top and at the bottom thereof.

Located within the socket is a disk 42, having an off-center transverse bore to fit over pin 41, the disk being kept in place on said pin by means of a nut 48. An arm 43, extends radially from said disk across beam 10 and terminates within a rectangular aperture in a circular plate 44, which rotates freely in a correspondingly shaped depression in the surface of block 33. The end of arm 43 within plate 44 is in a sliding contact with the walls of the rectangular aperture as the extent of its penetration into said aperture may vary with the up and down movement of the block in which the plate is located. Said end of arm 43 is split and provided with a tapered screw 45 in order that the split parts may be expanded to prevent any looseness of contact between said end and the aperture in which it is seated. As shown in Fig. 10, a modified pin, 49, may also be split and provided with a tapered screw 50 for expansion of the split parts. Similarly disk 42 may also be split.

The gauge is used in the following manner: After screw 21 in clamp 20 has been loosened, head 13, including arm 16 and scriber 17, is adjusted manually on beam 10 as closely as it can be done, to indicate the height of a given object. The specific height will be indicated by pointer 15 on scale 12. As head 13 of which the pointer is a part, is connected to bar 23, and the latter may be raised or lowered by means of screw 25 having a knurled head 26, it is possible to raise or to lower the head by means of said screw so that the pointer will coincide exactly with a respective calibration on beam 10. In order to secure more accurate reading to the fraction of the unit which is used in calibration 12 on beam 10, I am employing the slide ruler 30. The ruler shows a number of equal divisions beginning at zero and going up and down, respectively. As the ruler is connected to block 33, and the latter is located within head 13 which includes pointer 15, the sliding ruler may be marked so that the zero calibration thereon will be normally set opposite the pointer 15. This means that no matter which line of division on calibration 12, pointer 15 indicates, the initial notation on ruler 30 will be zero. To obtain vernier readings on ruler 30, the knurled head 35 of screw 34 is turned manually. This, let us assume for the sake of illustration, will cause block 33 to move upwardly. Arm 43 will be thereby swung upwardly and disk 42 will turn around pin 41 in a clock-wise direction in socket 39. This is shown in Fig. 6. As bar 23 including its expanded portion 38, is fixed and said disk 42 is eccentric to an extent which will be indicated hereinafter, the turning of disk 42 will cause pin 41 to shift upwardly. As the pin is affixed to head 13, it is the whole head that will be so shifted with the pin.

It will be seen that arm 43 is a few times longer than the radius of disk 42. By reason thereof, any movement of the disk as measured along its periphery, will be shown in distances a few times larger along the periphery of a circle described by the free end of arm 43. Conversely, relatively large distances between calibrations on a tangential line drawn from the periphery of a circle described by the free end of arm 43, will represent minute distances on the periphery of disk 42. This is shown in Fig. 9 wherein the tangential line $c-y$, corresponds to my sliding ruler 30 and radius $a$ corresponds to arm 43, while circle $g$ corresponds to disk 42. Distances $c-x1$, $x1-x2$, etc., are all even and each is intended to represent an equal fraction of the measuring unit used in scale 12 on beam 10. Obviously corresponding distances on the arc of the larger circle, that is distances $c-d1$, $d1-d2$, etc., are not equal to each other, but the whole of said arc from $c$ to $d5$, has its counterpart in arc $e-f$ of the smaller circle $g$. It will be remembered that disk 42 in my gauge is slightly eccentric. Here is the purpose and the reason thereof. If calibrations on line $c-y$ are to represent, say, $\frac{1}{1000}$ of an inch, the smaller circle which represents disk 42, must be made eccentric so that each successive radius corresponding to the radius in the larger circle intersecting a respective calibration on line $c-y$, must be $\frac{1}{1000}$ of an inch longer. In the drawings in Fig. 9, radius $0-f,1$ would be $\frac{5}{1000}$ of an inch longer than radius $0-e$. In my gauge the eccentric periphery $e-f,1$, would have its counterpart on the lower side of disk 42 so that radius $0-e$, would coincide with the perpendicular diameter of the disk or line $x-z$ in circle $g$, respectively. Another such eccentric periphery of the same arcuate dimension is diametrically opposed on the upper side of disk 42.

In practical application, the sliding ruler of my gauge has 25 equal calibrations, counting up from the zero notation and the same number of calibrations downwardly from the zero line, each calibration representing $\frac{1}{1000}$ of an inch. As block 33 is moved the whole distance from one calibration to another, the disk in its rotary movement, will because of its eccentricity shift head 13 to a distance of $\frac{1}{1000}$ of an inch. Naturally, any other measuring unit and any other number of divisions on the vernier sliding ruler 30 may be adapted if preferred. The main point is, however, that distances between calibrations on the vernier sliding ruler 30, may be made suitably large and that because of that, they may be read easily.

I wish to add that a complete turn of screw 35 will move block 33 to a distance of one calibration on ruler 30. It is therefore theoretically possible to subdivide the circumference of said screw into ten equal parts and to obtain a reading to $\frac{1}{10}$ of the vernier calibration shown on ruler 30.

It is obvious that some changes may be made in the construction of my gauge and that it may be applied to other measuring instruments such as calipers, micrometers, etc., the inventive principle disclosed herein being made a part of such instruments. What I therefore wish to claim is the mechanism herein disclosed, no matter to what gauging instrument it may be applied. Specifically I wish to claim the following:

1. In a height gauge of the kind described, an upright beam having one side marked with calibrations, a vertically sliding head on said beam, including a pointer directed at said calibrations and a lateral arm adapted to support a scriber, a sliding clamp on said beam, spaced from said head, a member connecting the head to the clamp, means to adjust the spacing between them, said member having an expanded portion within a recess in the head and provided with a circular socket therein, a vernier ruler slidingly abutting the calibrated side of the beam, a disk fitting into said circular socket and having an eccentric bore, a pin connected to said head and passing through said bore, an arm extending radially from said disk to the sliding ruler and screw means to vertically move said sliding ruler and to vertically shift said head by means of said pin seated in the eccentric bore of said disk.

2. In a height gauge of the kind described an upright beam, having one side provided with calibrations, a vertically sliding head on said beam, including a pointer directed at said calibrations, and a laterally extending arm, adapted to support height marking means, said head having a recess therein, a vertically sliding clamp on said beam above said head and spaced therefrom, a member parallel to the beam connecting the clamp with the head, screw means to adjust spacing between them, said member having an expanded portion disposed within said recess and containing a circular socket, a disk fitting into said socket and having an eccentric bore, a pin affixed to said head and passing through said bore, a sliding vernier ruler abutting the calibrated side of the beam and having a lateral block, an arm at one end pivotally located within said block and at the other end connected radially to said disk, and screw means to vertically move said block and ruler to swing the disk, and to vertically shift the head by means of said pin.

3. A height gauge of the kind described having an upright beam calibrated along its edge, a sliding head on said beam with a pointer directed at said calibrations, a clamp above said head adapted to slide on said beam, an adjustable member member extending from the clamp to the head and having a circular socket opposite the body of said head, a disk with an eccentric bore fitting into said socket, a pin projecting from the head through said bore, a sliding vernier ruler abutting the calibrated side of the beam, an arm radially extending from the disk to the sliding ruler, and screw means to vertically move the ruler causing by means of said arm to swing the disk and to vertically shift the sliding head by means of said pin.

JOSEPH BARDEGA.